United States Patent [19]
Watanabe et al.

[11] 3,936,368
[45] Feb. 3, 1976

[54] METHOD FOR CURING A COATING FILM

[75] Inventors: Tadashi Watanabe; Tsutomu Maruyama, both of Hiratsuka, Japan

[73] Assignee: Kansai Paint Company, Ltd., Japan

[22] Filed: Nov. 27, 1970

[21] Appl. No.: 93,466

[30] Foreign Application Priority Data
Dec. 3, 1969  Japan.................................. 44-96484

[52] U.S. Cl. ................................................ 204/181
[51] Int. Cl.² ............................................. C25D 13/06
[58] Field of Search ..................................... 204/181

[56] References Cited
UNITED STATES PATENTS

| | | | |
|---|---|---|---|
| 3,230,162 | 1/1966 | Gilchrist | 204/181 |
| 3,488,273 | 1/1970 | Johnson | 204/181 |
| 3,578,577 | 5/1971 | Gilchrist | 204/181 |

*Primary Examiner*—Howard S. Williams
*Attorney, Agent, or Firm*—Ostrolenk, Faber, Gerb & Soffen

[57] ABSTRACT

A method for curing a coating film wherein a film-forming, polymerizable, organic coating material is electrodeposited upon an electroconductive object as an anode immersed in an aqueous dispersion of an acidic alkyd resin modified with conjugated unsaturated fatty acid and/or oil, wherein the acidic alkyd resin has an oil length in the range of 10 to 60 wt % and a resin acid value in the range of 30 to 100, being neutralized with water soluble bases, and then the curing coating film thus obtained by applying ionizing radiation.

10 Claims, No Drawings

METHOD FOR CURING A COATING FILM

This invention relates to a method of curing a coating film, and more particularly to a method of curing a coating film wherein a film-forming, polymerizable, organic coating material is electrodeposited upon an electroconductive object immersed in an aqueous dispersion and the coating film thus obtained is cured by applying ionizing radiation.

In ordinary method of curing the electrophoretic coating films, baking in a heating oven is generally used, and it takes relatively long curing time. When the coating film is cured at a room temperature, a very long time is required to obtain a desirable hardness. These curing methods have the disadvantages that a long curing time and a large floor space for the coating process are required.

Recently, it is known that a tough coating film can be obtained from a composition of resin containing polymerizable groups and polymerizable liquid monomer by applying ionizing radiation to excite the monomer to radically polymerize and to form cross-linking structure by combining with the resin molecule. However, such composition is not suitable for the electrophoretic coating method, and it is generally accepted that the curing of the coating film obtained from an aqueous composition by applying ionizing radiation is impossible. In the radical polymerization of curing by applying ionizing radiation, it has been the problem that the polymerization type of the surface of the coating film is inhibited by the oxygen in air.

The above-mentioned defects are resolved, and a novel method of curing has been invented, in which an aqueous dispersed composition is applied on the surface of an electroconductive object by the electrophoretic coating method, and then electro-deposited coating is applied by ionizing radiation, especially a high power electron beam, to cure the coated film.

In this invention, an alkyd resin modified with conjugated unsaturated fatty acid and/or conjugated unsaturated oil and having resin acid value of 30 to 100, is neutralized by nitrogen containing bases, inorganic alkalis or their salts, or their mixtures in the range of 0.7 to 1.2 stoichiometrical equivalents to the carboxyl groups of the resin, and then the resulting product is dispersed in water to obtain an aqueous dispersed composition. Said composition is applied on the surface of an electroconductive object by the electrophoretic coating method, and the electrodeposited coating is cured by ionizing radiation.

The alkyd resin having an acid value in the range of 30 to 100 can be produced by the known method. The conjugated unsaturated fatty acid and/or conjugated unsaturated oil such as tung oil, tung oil fatty acid, oiticica oil, oiticica oil fatty acid, dehydrated castor oil, dehydrated castor oil fatty acid, conjugated safflower oil, conjugated safflower oil fatty acid and highly conjugated linoleic acid is an essential component of the alkyd resin.

Without using said unsaturated material, the hardness of the cured film cannot be expected by applying ionizing radiation. Non-conjugated unsaturated fatty acid or non-conjugated unsaturated oil cannot be polymerized or hardly be polymerized by applying ionizing radiation. This fact is similar to the cases of thermal polymerization reaction and oxidation polymerization reaction.

Further, when said conjugated unsaturated fatty acid or conjugated unsaturated oil is compared with an $\alpha,\beta$-ethylenically unsaturated compound such as maleic anhydride as the hardening components, the former acts as an internal plasticizer as well as a hardening agent and gives elasticity to the coating film, and the curing is promoted by the existence of oxygen in air while the latter is inhibited from the curing by oxygen in air. Furthermore, thermal polymerization reaction of the former has not taken place as compared with that of the latter, and accordingly, the production of the resin from the former material is easier.

As aforementioned, said conjugated unsaturated fatty acid and/or conjugated unsaturated oil perform an important role as a hardening component and is to be contained in the resin in the range of 10 wt% to 60 wt%. If it is less than said amount, the coating film cannot be cured by applying ionizing radiation.

In this invention, non-conjugated unsaturated fatty acid or oil is also used. In this case, the non-conjugated unsaturated fatty acid or oil must be used as a mixture with a conjugated unsaturated fatty acid or oil, and the mixing ratio of said conjugated unsaturated fatty acid and non-conjugated unsaturated fatty acid is an important factor to the hardening reaction. The conjugated unsaturated fatty acid in the amount of 30 wt% or more (against the total weight of fatty acid component) is necessary, otherwise substantial curing cannot be expected by applying ionizing radiation.

The alkyd resin is obtained by esterifying the polyalcoholic components with organic acid components. As the alcoholic components, for example, ethylene glycol, diethylene glycol, propylene glycol, dipropylene glycol, trimethylolethane, trimethylolpropane, pentaerythritol and neopentyl glycol are used. As the acid components, for example, phthalic anhydride, hexahydrophthalic anhydride, tetrahydrophthalic anhydride, isophthalic anhydride, trimellitic anhydride, acid, adipic acid, maleic anhydride, itaconic anhydride, linseed oil fatty acid and soybean oil fatty acid are used. Said alkyd resin, modified with conjugated unsaturated fatty acid and/or conjugated unsaturated oil, having an acid value in the range of 30 to 100 is prepared according to the usual preparation of the ordinary water dispersed alkyd resin for electrophoretic coating except that conjugated unsaturated fatty acid and/or conjugated unsaturated oil are used and the resin acid value is adjusted into the range from 30 to 100. When the resin acid value is less than 30, water dispersibility becomes worse and when the resin acid value is more than 100, the property of the coating film becomes worse.

The carboxyl groups of the alkyd resin thus obtained are neutralized with water soluble bases. As the water soluble bases, for example, water soluble amino compounds, inorganic alkali compounds and alkaline salts are used. As the water soluble amino compounds, alkylamines such as diethylamine, triethylamine and trimethylamine, and alkanolamines such as monoethanolamine, diethanolamine, triethanolamine, diisopropanolamine, dimethylaminoethanol and diethylaminoethanol are used. As inorganic alkalis, aqueous ammonia, sodium hydroxide and potassium hydroxide are used, and as alkaline salts, ammonium carbonate, sodium carbonate and potassium carbonate are used. Each base can be used either in single or in a mixture of two or more. The aqueous dispersion can be obtained by neutralizing the carboxyl groups in the alkyd resin with 0.7 to 1.2 stoichiometrical equivalents of the water soluble bases. In the step of dispersing in water, hydrophilic solvent may be used, if necessary. As this hydrophilic solvent, for example, n-butanol, isopropanol, benzyl alcohol, diacetone alcohol, ethylene glycol monoalkyl ether and methyl-2-methyl-2-methoxypropyl ketone are used.

The electrophoretic coating method of this invention is the same as the ordinary one. For example, the aqueous dispersed composition is charged into the bath. The bath may be used as a cathode, or an electroconductive object is immersed as a cathode in the composition. The electroconductive object to be coated is immersed into an aqueous dispersed composition and said object may be used as an anode. Then an electric current is passed between both electrodes to effect sufficient deposition of electrodeposited film upon said anode.

Thus, an insoluble coating can be electrodeposited on the surface of said anode by the electrochemical reaction. As the temperature and the voltage in the bath may be changed in the process of electrophoretic method, an ion-exchange membrane may be used in an apparatus for performing the process of said method to keep a suitable aqueous dispersed composition.

The ionizing radiations as used in the method of this invention are proton beam, alpha-ray, beta-ray, gamma-ray, accelerated electron beam, X-ray, etc., in which said accelerated electron beam, beta-ray and gamma-ray are preferable. As the sources of these radiations, several electron accelerators, strontium 90, cobalt 60 and cesium 137 are used.

In general, the coating film obtained from aqueous dispersed compositions cannot be cured by applying ionizing radiation. However, the coating film which is obtained by using an aqueous dispersed composition of the alkyd resin in this invention and electrodeposition can be cured by applying ionizing radiation. Furthermore, the coating film electrodeposited in this invention can be cured in a moment by applying ionizing radiation because the water content of the coating film which is electrodeposited by the electrophoretic method is small, and in addition, the small quantity of water does not inhibit the radical polymerization reaction and a very small amount of amine in the coating film acts as a promoter. Accordingly, the method of this invention is exceedingly advantageous as compared with the ordinary method.

The temperature of the object to be coated when ionizing radiation is applied is not particularly specified, however, a temperature in the range of 50° to −5°C is substantially preferable. The period of time the ionizing radiation is to be applied is different according to the strength of the radiation, and generally known period of radiation time is efficient within the range of several seconds to several minutes. When a high-powered electron accelerator is used in applying ionizing radiation, the coating film can be cured in a few seconds, which can be advantageously adopted in a high speed continuous production process. The dose rate can be varied in accordance with the condition of radiation. The dose of the radiation is in the range of 0.1 to 40 M rad, preferably 0.5 to 20 M rad.

Before the curing of the coating film by applying ionizing radiation, or while applying the radiation, or after the application of the radiation, heating by hot air or by an infrared lamp can be done without any disadvantages, and in some cases, the heating is preferable in the curing process.

In the method of this invention, the thickness of the coating film can be made uniform and that the coating film of a desired thickness can be obtained. Further, the film can be cured completely in a very short period of time by applying ionizing radiation, and the obtained coating film is superior in its property. In a high speed coating process such as coil coating, the electrophoretic coating have advantages as compared with the ordinary method using a roll coating. Further, as to the curing of the coating film, a large floor space is required when a stove for baking is used as in the ordinary method, however in accordance with the curing method of this invention, only a small floor space is necessary for the curing equipment as the curing time is very short. Therefore, the method of this invention is very advantageous for the industrial process of high speed coating.

The folllowing examples are offered for the purpose of illustration of the invention and are not intended as limiting.

In each example, all parts or percents are by weight unless otherwise specified.

EXAMPLE 1

Into a sealed reaction vessel which is provided with a thermometer, an agitator, an inlet pipe for inert gas and a water separator, a mixture consisting of the following ingredients was charged.

| | |
|---|---|
| Phthalic anhydride | 377 parts |
| Pentaerythritol | 69 parts |
| Trimethylolethane | 241 parts |
| Linoleic acid, highly conjugated (Trade name HIGHDIENE, made by Soken Kagaku Kabushiki Kaisha, Japan; neutralization value 200 and iodine value 175) | 343 parts |
| p-tert-butyl benzoate | 44 parts |
| Xylene, as an azeotrope forming solvent (mixture of 30% o-xylene, 30% m-xylene and 40% p-xylene) | 60 parts |

The mixture of the above ingredients was esterified by the conventional method of preparing alkyd resin by heating upto 220°C under nitrogen atomosphere and agitation for 5 hours and maintaining said temperature until the resin acid value to 15. Then the reaction product was cooled to 170°C and 102 parts of phthalic anhydride was added. The temperature of the contents was kept at 150°C and was half-esterified a further one and a half hours with agitation.

The acid value of the obtained half-esterified product was 54. The reaction product was diluted with 440 parts of ethylene glycol monobutyl ether and 110 parts of butanol, and was neutralized by an addition of 87 parts of dimethylaminoethanol (0.9 equivalent to the carboxyl groups in the said product). 1013 parts of water was added to obtain an aqueous dispersed alkyd resin varnish of 40% concentration.

Into 325 parts of the above resin varnish, 1.3 parts of 60% cobalt naphthenate in toluene solution was added and mixed well, and a further 675 parts of water was added with agitaiion to obtain an aqueous dispersed composition having 13% of nonvolatiles.

Using zinc galvanized iron sheet of 0.27 mm in thickness as an anode (anode area: 100 cm$^2$) and polished steel plate as a cathode (cathode area: 100 cm$^2$), electrophoretic coating was carried out for each ten seconds in a bath of the above-mentioned composition at 40°C, while the electric voltage was changed. The electrodeposited plate was rinsed with water, and was cured by baking for 30 minutes at 150°C. The result is shown in the following Table 1.

Table 1

| Number | 1 | 2 | 3 | 4 |
|---|---|---|---|---|
| Voltage applied (V) | 40 | 50 | 60 | 70 |
| Weight of coating (mg/100 cm$^2$) ...(Note 1) | 25.8 | 29.3 | 56.9 | 136.6 |
| Thickness of coating (micron) | 2.7 | 3.1 | 6.0 | 14.3 |

Note 1: Weight of coating after the baking for 30 minutes at 150°C.

Another test plate was applied with coating by electrophoretic method in accordance with the above test No. 3.

After water rinse and air blowing, the coating film was caused to cure by a transformer type electron accelerator with a radiation of electron beam of 300 KV in acceleration energy, 25 mA in electric current and 3 M rad in total dose.

The above-mentioned result is shown in Table 2 together with two results not using an electron beam, one of which is cured at room temperature and the other is cured by baking at 100°C for 5 minutes.

Table 2

| Tests | Curing Without electron beam | 3 M rad electron beam | Baked at 100°C for 5 min. |
|---|---|---|---|
| Pencil scratch test (Note 2) | HB | 2H | H |
| Impact resistance (Note 3) | good | Excellent | good |
| Erichsen resistance (Note 4) | slightly peeled off | Excellent | good |
| Solvent resistance (Note 5) | 60 | More than 100 | 90 |
| Salt-spray resistance (Note 6) | bad | Less than 1 mm | 3 mm |

Note 2: According to JIS (Japanese Industrial Standard) K 5652 (5.15) (1957), Method of testing pecil scratch value.

Note 3: Used Du Pont impact tester. The diameter of the impact core was a half an inch. Cracked or peeled off portions of the coatings were observed after 1 kg weight was dropped from 50 cm height.

Note 4: Tested according to JIS B 7777 (1952), Erichsen film test method. Test plate was pushed out from Erichsen film tester in 6 mm, Scotch tape was attached to the pushed out portion and then the tape was peeled off to the 180°counter direction. Then cracked or peeled off portions of the coating were observed.

Note 5: The surface of the coating was rubbed with xylene soaked gauze until the ground metal became visible. The number of rubbing was counted.

Note 6: Tested according to JIS Z 2371 (1955). The test panel was given cross cut and exposed to the salt-spray. After 72 hours' duration, blisters, rust and other defects of the coating at the cuts were observed.

As will be understood from Table 2, the coating which was applied by electrophoretic method and cured by electron beam, was superior in its property.

EXAMPLE 2

The following ingredients were charged into a reaction vessel as used in Example 1.

Example 2
The following ingredients were charged into a reaction vessel as used in Example 1.

| | |
|---|---|
| Phthalic anhydride | 384 parts |
| Pentaerythritol | 115 parts |
| Trimethylolethane | 233 parts |
| Tung oil fatty acid | 288 parts |
| p-tert-butyl benzoate | 49 parts |
| Sodium carbonate (Na$_2$CO$_3$, chemically pure reagent first grade) | 5 parts |
| Xylene, as azeotrope forming solvent | 50 parts |

Under nitrogen atmosphere, the mixture was heated upto 200°C with agitation and further reacted for 8 hours until the acid value dropped 14. The temperature of the reaction product was cooled to 110°C, and then 96 parts of maleic anhydride and 0.6 part of hydroquinone were added and was further half-esterified for 1 hour at 110°C with agitation.

The resin acid value of the obtained half-esterified product was about 65. The reaction product was diluted by adding 550 parts of ethylene glycol monobutyl ether and 110 parts of butanol, and was then neutralized by adding 107 parts of diethanolamine (0.8 equivalent to the carboxyl groups in the said product). 883 parts of water was added into the product to obtain a 40% aqueous dispersed alkyd resin composition.

An amount of 625 parts of the above resin composition was added with 2.5 parts of 60% toluene solution of cobalt naphthenate and mixed well, and thereafter 375 parts of water was added with agitation to obtain a composition with 25% non-volatiles. 50 parts of ferric oxide pigment was added and dispersed by a ball mill for 20 hours, thus obtaining an aqueous dispersed enamel. Into 526 parts of the above enamel, 474 parts of water was added gradually with agitation and an aqueous dispersed composition with 15% non-volatiles was obtained.

Electrophoretic coating was carried out using the above-mentioned composition, in which the temperature of the bath was 35°C, a surface treated steel plate of 0.8 mm in thickness (anode area 100 cm$^2$) was used as the anode, a polished steel plate (cathode area 100 cm$^2$) was used as the cathode, supplied electric voltage was 70 volts and the time of coating was 15 seconds. The obtained coating film was 13 microns in thickness after being dried.

Several test plates were applied with coatings in accordance with the above method, and a first group was coated a further 20 microns of electron beam curing type unsaturated polyester white enamel film and was not applied with the electron beam radiation. A second group of test plates was treated with 3 M rad radiation of electron beam in the same conditions as those in Example 1 and thereafter 20 microns in thickness of the above unsaturated polyester white enamel film were applied. These two kinds of the test plates were then treated with 6 M rad electron beam radiation under the same conditions as in Example 1, and the resultant properties of the coatings are shown in the following Table 3. For comparison, the properties of coatings of the above two kinds of plates which were coated with electrophoretic coating only, and further of the two kinds of plates which were coated with further 20 microns film of the following mixture and left for 8 hours in a constant temperature room at 20°C, are also shown in the following Table 3. Said mixture was prepared by adding 1 part of 60% dibutyl phthalate solution of methylethyl ketone peroxide as polymerization initiator, into 100 parts of said unsaturated polyester white enamel for metals, and mixed well, and thereafter 0.5 part of a 60% toluene solution of cobalt naphthenate was added thereto.

Table 3

Note 1: The same as the Note 2 in Example 1.
Note 2: The same as the Note 3 in Example 1 except that 500 g weight was dropped from 30 cm height.
Note 3: A checker pattern consisting of 100 1 mm squares was made by a knife blade, in which each cut was to reach the surface of the base metal. Then a self-adhesive tape was attached onto the surface of the coating and the tape was then peeled off to the 180° counter direction.
Note 4: The same as the Note 6 in Example 1.

Into 750 parts of the above resin varnish, 3.0 parts of 50% toluene solution of cobalt octinate was added with agitation and a further 1250 parts of water was added and mixed well to obtain an aqueous dispersed composition with 15% non-volatiles.

Electrophoretic coating was carried out using the abovementioned composition, in which the temperature of the bath was 30°C, a polished steel plate of 0.8 mm in thickness was used as the anode (anode area 200 cm$^2$), also a polished steel plate of 0.8 mm in thickness was used as the cathode (cathode area 200 cm$^2$), supplied electric voltage was 70 volts and the time of coating was 60 seconds. The obtained coating film was 20 microns in thickness after dried.

5 M rad electron 4 radiation under the same conditions of Example 1 was applied to the thus coated test plates and then the test plates were subjected to pencil scratch test and gel fraction measurement, the results of which are shown in Table 4. For comparison, the test results of the plates which were not applied with electron beam radiation and of the plates which were baked Table 3

| Electrophoretic coating | Not applied with electron beam | | | Applied 3 M rad electron beam | | |
|---|---|---|---|---|---|---|
| Top coating | None | Cured with polymerization initiator | Cured with 6 M rad electron beam | None | Cured with polymerization initiator | Cured with 6 M rad electron beam |
| Test | | | | | | |
| Pencil scratch test (Note 1) | B | B | H | F | HB - F | 2H |
| Impact resistance (Note 2) | Good | Good | Excellent | Good | Good | Excellent |
| Adhesion resistance (Note 3) | Slightly peeled off | Slightly peeled off | Good | Good | Good | Excellent |
| Salt-spray resistance (Note 4) | Bad | Bad | Less than 1 mm | Less than 1 mm | Gloss reduced slightly | Less than 1 mm |

The results obtained from the electrophoretic coating cured by electron beam were superior in respect of the impact test, the adhesion test and the anti-corrosiveness, as will be understood from Table 3.

EXAMPLE 3

The following ingredients were charged into the same reaction vessel as in Example 1.

| | |
|---|---|
| Phthalic anhydride | 282 parts |
| Pentaerythritol | 32 parts |
| Trimethylolethane | 264 parts |
| Isomerized linseed oil fatty acid (conjugated) fatty acid content 30%, neutralization value 201 and iodine value 135) | 400 parts |
| Xylene, as azeotrope forming solvent (the same as in Example 1) | 50 parts |

Under nitrogen atmosphere, the mixture was heated upto 180°C and reacted for 1 hour at this temperature. The temperature of the above was raised to 200°C and further reacted for 1 hour. Into the above reaction product, 91 parts of trimellitic anhydride was added and further reacted for 4 hours at 210°C until the resin acid value dropped 55. The reaction product was cooled to 180°C and was diluted with 400 parts of diacetone alcohol and 100 parts of butanol, and then neutralized by adding 102 parts of diethanol amine (1.0 equivalent to the carboxyl groups in the said product). The above product was further added with 898 parts of water to obtain 40% aqueous dispersed alkyd resin varnish.

at 100°C for 5 minutes, are shown together.

Table 4

| Curing Test | Without radiation | 5 M rad radiation | Baked at 100°C for 5 min. |
|---|---|---|---|
| Pencil scratch test (Note 1) | 6B | B - HB | 2B |
| Gel fraction (%) (Note 2) | 4.8 | 72.1 | 57.6 |

Note 1: The same as the Note 2 in Example 1.
Note 2: The coating was scraped off from the test plate, and the scraped coating film was wrapped by a stainless steel wire net of 300 mesh and was extracted by acetone in a Soxhlet's extractor for 20 hours and dried at 110°C, then finally weighed. Gel fraction was calculated according to the following formula.

$$\text{Gel fraction (\%)} = \frac{\text{Weight of insoluble residue}}{\text{Weight of scraped coating film}} \times 100$$

The relative degree of cross linkage can be known by this gel fraction.

EXAMPLE 4

The following ingredients were charged into the same reaction vessel as used in Example 1.

| | |
|---|---|
| Phthalic anhydride | 377 parts |
| Pentaerythritol | 69 parts |
| Trimethylolethane | 241 parts |
| Highly conjugated linoleic acid | 343 parts |
| p-tert-butyl benzoate | 44 parts |
| Xylene, as azeotrope forming solvent | 60 parts |

Under nitrogen atomosphere, the temperature of mixture was raised to 220°C with agitation, and the mixture was reacted for 5 hours until the resin acid value dropped 15. Thereafter, the temperature of the reaction product was cooled to 170°C and 56 parts of phthalic anhydride was added, and the reaction product was half-esterified further at 150°C for one and a half hour with agitation.

The acid value of obtained half-esterified product was about 35. The reaction product was diluted with 528 parts of diacetone alcohol and 106 parts of butanol, and then neutralized by adding with 84 parts of diethanolamine (1.2 equivalent of the carboxyl groups in the said product). Thereafter 866 parts of deionized water was added to obtain 40% aqueous dispersed alkyd resin composition.

An aqueous dispersed composition with 13% non-volatile was obtained by adding 1350 parts of deionized water gradually into 650 parts of the above resin composition.

Electrophoretic coating was carried out using said composition, in which the temperature of bath was 35°C, a polished steel plate of 0.8 mm in thickness was used as the anode (anode area 200 cm$^2$), the same plate was also used as the cathode (cathode area 200 cm$^2$), supplied electric voltage was 80 volts and the time of coating was 10 seconds. The dried thickness of thus formed coating was 15 microns.

To the thus formed coating film was applied 5 M rad of electron beam radiation in the same conditions as in Example 1 and, thereafter the coating film was subjected to pencil scratch test and gel fraction measurement, the results of which are shown in Table 4. For comparison, the test results of the coating without the curing of electron beam and of the coating baked at 100°C for 5 minutes in a hot blast stove are shown together.

Table 4

| Test | Curing Without radiation | 5 M rad radiation | Baked at 100°C for 5 min. |
|---|---|---|---|
| Pencil scratch test (Note 1) | B | H - 2H | HB |
| Gel fraction (%) (Note 2) | 4.0 | 68.9 | 49.7 |

Note 1: The same as the Note 2 in Example 1
Note 2: The same as the Note 2 in Example 3.

EXAMPLE 5

The following ingredients were charged into the same reaction vessel as used in Example 1.

| Phthalic anhydride | 377 parts |
|---|---|
| Pentaerythritol | 69 parts |
| Trimethylolethane | 241 parts |
| Highly conjugated linoleic acid | 343 parts |
| p-tert-butyl benzoate | 44 parts |
| Xylene, as azeotrope forming solvent | 60 parts |

Under nitrogen atmosphere, the mixture was heated to 220°C with agitation, and was reacted for 5 hours until the resin acid value dropped 15. Thereafter, the reaction product was cooled to 170°C and 322 parts of tetrahydrophthalic anhydride added, and further was half-esterified at 160°C for one and a half hour with agitation.

The obtained half-esterified product was about 93 in the acid value. The reaction product was diluted with 661 parts of ethylene glycol monobutyl ether and 132 parts of butanol. Into the above diluted product, 1190 parts of alkaline solution made from 86 parts of potassium hydroxide (chemically pure reagent, first grade) and 1104 parts of deionized water, was added. An aqueous dispersed alkyd resin composition of 40% resin concentration was obtained. The neutralization equivalent in this case was 0.7.

Into 650 parts of the above alkyd resin composition, 1350 parts of deionized water was added gradually with agitation to obtain an aqueous dispersed composition with 13% non-volatiles.

Electrophoretic coating was carried out using the above-mentioned composition, in which the temperature of the bath was 30°C, a polished steel plate of 0.8 mm in thickness was used as the anode (anode area 200 cm$^2$), the same plate was also used as the cathode (cathode area 200 cm$^2$), supplied electric voltage was 80 volts, and the time of coating was 8 seconds. The dried thickness of the coating film was 16 microns.

To this coating film was applied 6 M rad electron beam radiation and subjected to pencil scratch test and gel fraction measurement, the results of which are shown in Table 5.

For comparison, the test results of the coating without the curing of electron beam and the coating baked at 100°C for 5 minutes in a hot blast stove, are shown in the same table.

Table 5

| Test | Curing Without radiation | 5 M rad radiation | Baked at 100°C for 5 min. |
|---|---|---|---|
| Pencil scratch test | B | H - 2H | HB - H |
| Gel fraction (%) (Note 2) | 5.1 | 70.3 | 48.9 |

Note 1: The same as the Note 2 in Example 1.
Note 2: The same as the Note 2 in Example 3.

As shown in the Examples 1 to 5 inclusive, the coating film of the present invention which was applied by electrophoretic coating method can be cured in a short period of time, and the properties of the obtained coating are superior.

What is claimed is:
1. A method for curing a coating film upon a coated electroconductive object comprising in combination the steps of:
   a. immersing said object in an electrophoretic bath comprising an aqueous dispersed composition characterized in that said composition is both electrodepositable as an adherent film upon an anode immersed therein and polymerizable thereon by applying ionizing radiation, said aqueous dispersed composition comprising an aqueous dispersion of an acidic film-forming binder, and said acidic film-forming binder being a conjugated unsaturated fatty acid, conjugated unsaturated oil or mixture thereof modified alkyd resin having an oil length in the range of 10–60 weight percent and a resin acid value in the range of 30–100, the carboxylic groups of said modified alkyd resin being neutralized with at least one water-soluble base selected from amino compounds, inorganic alkali compounds and alkaline salts, in the range of 0.7 to 1.2 stoichiometrical equivalents of the carboxyl groups of said modified alkyd resin, b. providing a direct current through said bath sufficient to effect deposition of a film of said composition upon said object as an anode by providing a difference of electrical potential between said anode and other electrode, c. transferring the resultant coated object from said bath containing said composition into an irradiation zone, and d. applying to the electrodeposited film upon said object, a 0.1–40 M rad dose of ionizing radiation until said film is cured by polymerization.

2. A method for curing a coating film upon a coated electroconductive object as claimed in claim 1, in which said conjugated unsaturated fatty acid or conjugated unsaturated oil is at least one material selected from the group consisting of tung oil, tung oil fatty acid, oiticica oil, oiticica oil fatty acid, dehydrated castor oil, dehydrated castor oil fatty acid, conjugated safflower oil, conjugated safflower oil fatty acid and highly conjugated linoleic acid.

3. A method for curing a coating film upon a coated electroconductive object as claimed in claim 1, in which said water soluble base is at least one compound selected from the group consisting of alkylamines alkanolamines inorganic alkali compounds and alkaline salts.

4. A method for curing a coating film upon a coated electroconductive object as claimed in claim 3 in which said alkylamine is diethylamine, triethylamine or trimethylamine; said alkanolamine is monoethanolamine, diethanolamine, triethanolamine, diisopropanolamine, dimethylaminoethanol or diethylaminoethanol; said inorganic alkali compound is aqueous ammonia, sodium hydroxide or potassium hydroxide; and in which said alkaline salt is ammonium carbonate, sodium carbonate or potassium carbonate.

5. A method for curing a coating film upon a coated electroconductive object as claimed in claim 1, in which said ionizing radiation is selected from proton beam, alpha-ray, beta-ray, gamma-ray, electron beam and X-ray.

6. A method for curing a coating film upon a coated electroconductive object as claimed in claim 5 in which the dose of the radiation is 0.5–20 M rad.

7. A method for curing a coating film upon a coated electroconductive object as claimed in claim 1 wherein said modified alkyd resin is of ingredients consisting of phthalic anhydride, pentaerythritol, trimethanolethane, highly conjugated linoleic acid and p-tert-butyl benzoate, and wherein said water-soluble base is dimethylaminoethanol.

8. A method for curing a coating film upon a coated electroconductive object as claimed in claim 1 wherein said modified alkyd resin is of ingredients consisting of phthalic anhydride, pentaerythritol, trimethanolethane, highly conjugated linoleic acid and p-tert-butyl benzoate, and wherein said water-soluble base is diethanolamine or potassium hydroxide.

9. A method for curing a coating film upon a coated electroconductive object as claimed in claim 1 in which said modified alkyd resin is of ingredients consisting of phthalic anhydride, pentaerythritol, trimethanolethane, tung oil fatty acid and p-tert-butyl benzoate, and in which said water-soluble base is sodium hydroxide and diethanolamine.

10. A method for curing a coating film upon a coated electroconductive object as claimed in claim 1 in which said modified alkyd resin is of ingredients consisting of phthalic anhydride, pentaerythritol, trimethanolethane, isomerized linseed oil and p-tert-butyl benzoate, and in which said water-soluble base is diethanolamine.

* * * * *